(12) United States Patent
Dreps et al.

(10) Patent No.: US 6,891,406 B2
(45) Date of Patent: May 10, 2005

(54) METHOD AND APPARATUS FOR SUPPLYING A REFERENCE VOLTAGE FOR CHIP-TO-CHIP COMMUNICATION

(75) Inventors: Daniel Mark Dreps, Georgetown, TX (US); James Douglas Jordan, Round Rock, TX (US); Joel David Ziegelbein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 10/339,754

(22) Filed: Jan. 9, 2003

(65) Prior Publication Data

US 2004/0139261 A1 Jul. 15, 2004

(51) Int. Cl.[7] ................................................. H03F 3/45
(52) U.S. Cl. ........................... 327/56; 327/77; 710/305; 714/798
(58) Field of Search ......................... 327/51, 56, 58–60, 327/62, 77, 78; 710/305, 310; 714/798, 799

(56) References Cited

U.S. PATENT DOCUMENTS 6,334,163 B1 * 12/2001 Dreps et al. ................. 710/260
6,507,219 B2 * 1/2003 Dabral et al. .................. 326/86
6,594,769 B2 * 7/2003 Dabral et al. ................ 713/300

* cited by examiner

Primary Examiner—Timothy P. Callahan
Assistant Examiner—An T. Luu
(74) Attorney, Agent, or Firm—Mark E McBurney; Anthony V S England

(57) ABSTRACT

A method for receiving data by an integrated circuitry chip includes receiving data signals and a first clock signal sent by a sending chip. The data signals are received by data receivers and the clock signal is received by at least one clock receiver of the receiving chip. A reference voltage is derived by reference voltage circuitry for the receiving chip responsive to the first clock signal. Logical states of the received data signals are detected. The detecting includes the data receivers comparing voltage levels of the received data signals to the derived reference voltage.

18 Claims, 5 Drawing Sheets

METHOD AND APPARATUS FOR SUPPLYING A REFERENCE VOLTAGE FOR CHIP-TO-CHIP COMMUNICATION

BACKGROUND

1. Field of the Invention

The present invention concerns communication from one integrated circuitry chip to another, and more particularly concerns supplying a more nearly optimal reference voltage for receiving data.

2. Related Art

In a chip-to-chip communication interface within a computer system data is sent from a driver on one chip to a receiver on another chip. In order for such an interface to operate efficiently at high data rates, the receiving chip must have an accurate reference voltage. The optimal reference voltage is dependent on many factors, including the supply voltage at the driver on one chip, the supply voltage at the receiver of the other chip and the amount of noise on the data nets in between, among others.

Referring now to FIG. 1, certain aspects are illustrated for a conventional chip-to-chip communication interface 100, according to the prior art. In the conventional interface a static voltage divider circuit 114 is used to generate a reference voltage 115 for a first chip, that is, chip A 110 on a first printed circuit board 101. Similarly, a static voltage divider circuit 124 is used to generate a reference voltage for chip B 120 on another printed circuit board 102.

This arrangement has a number of problems. First, the optimal reference voltage for a receiver will change if the supply voltage changes for the driver. For example, the desired reference voltage VREFB 125 for receivers 122 on chip 120 will change if the supply voltage V SUPPLYA 111 changes for drivers 113 on chip 110. However, according to the conventional interface illustrated the reference voltage VREFB 125 generated by voltage divider 124 only depends on the supply voltage V SUPPLYB 121 at the chip 120 of the receivers 122. This is commonly problematic because often a board will be released with a particular chip, such as a processor for example, and then later a pin-compatible, upgraded version of the processor will become available, typically with a lower supply voltage.

Also, in the arrangement depicted here the chips are on two different circuit boards. It is problematic in this sort of arrangement that the supply voltage V SUPPLYA 111 of the chip 110 drivers 113 exists only on the circuit board 101 where the chip 110 resides and not on the chip 120 having the receivers 122, for example. This is an obstacle to the receivers 122 which depend on the supply voltage V SUPPLYA 111 of the drivers 113.

Furthermore, as data signals propagate from a driver such as one of drivers 113 to a receiver such as one of the receivers 122 the signals acquire noise based on their surroundings, so that the signals received differ from the signals sent. Ideally, the reference voltage VREFB 125 at a receiver 122 should vary depending upon the amount of noise that a signal has acquired since being sent by the driver 113, so that the receiver can cancel out the noise and detect the signals that were actually sent. However, the static voltage divider 124 does not see the same noise.

For at least the above reasons a need exists for an improved method and apparatus for supplying a reference voltage.

SUMMARY OF THE INVENTION

The foregoing need is addressed in the present invention, in which, according to one form of the invention, data signals and a first clock signal are sent by a sending chip. The data signals are received by data receivers and the clock signal is received by a clock receiver of a receiving chip. A reference voltage is derived by reference voltage circuitry for the receiving chip responsive to the first clock signal. Logical states of the received data signals are detected, which includes the data receivers comparing voltage levels of the received data signals to the derived reference voltage.

In another aspect, a clock driver for the receiving integrated circuitry chip generates a second clock signal for sending by the receiving chip. Deriving the reference voltage by reference voltage circuitry for the receiving chip includes deriving the reference voltage responsive to the second clock signal.

Objects, advantages, additional aspects, and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
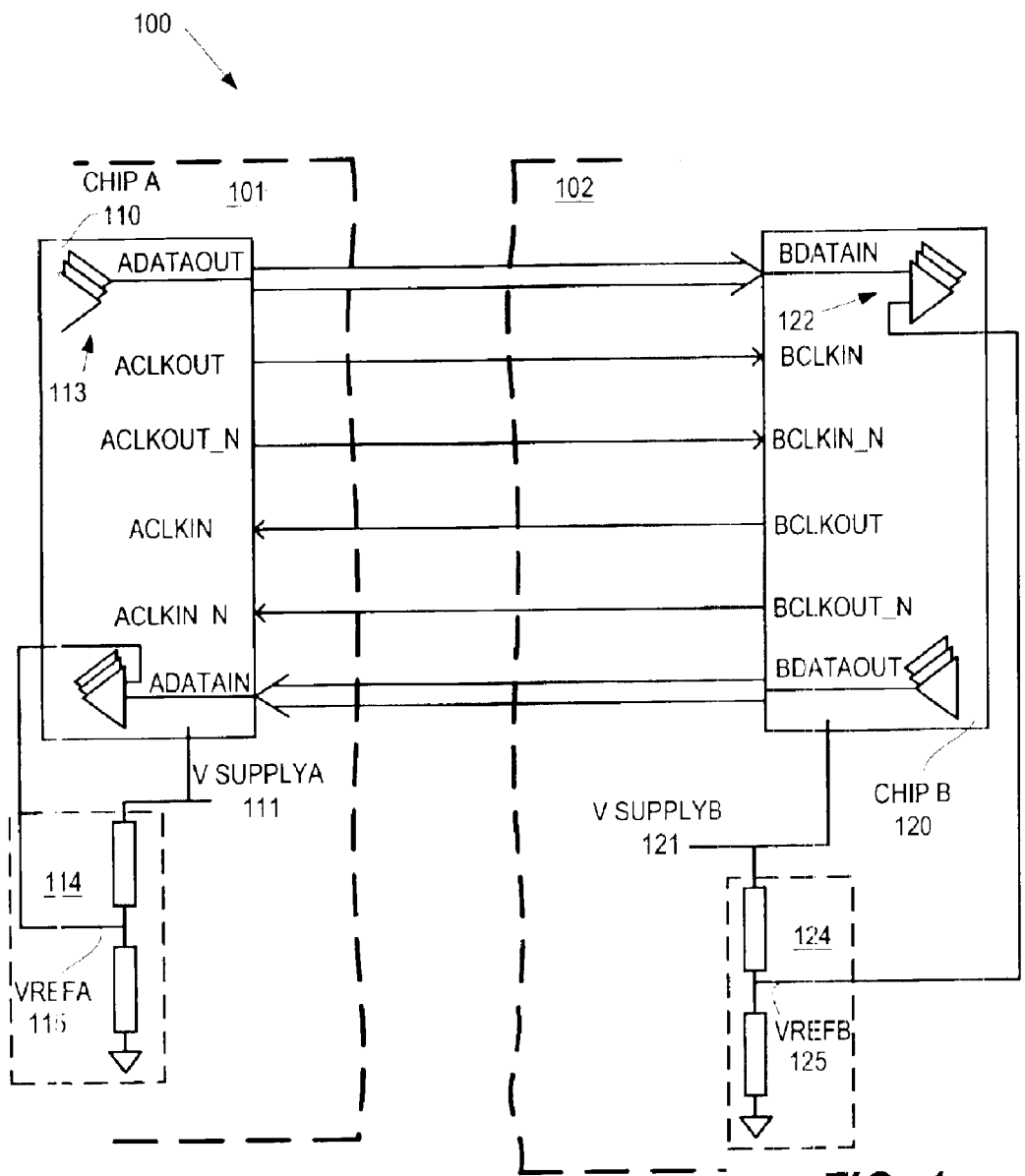
FIG. 1 illustrates aspects of a chip-to-chip communications interface, according to prior art.
Figure 2:
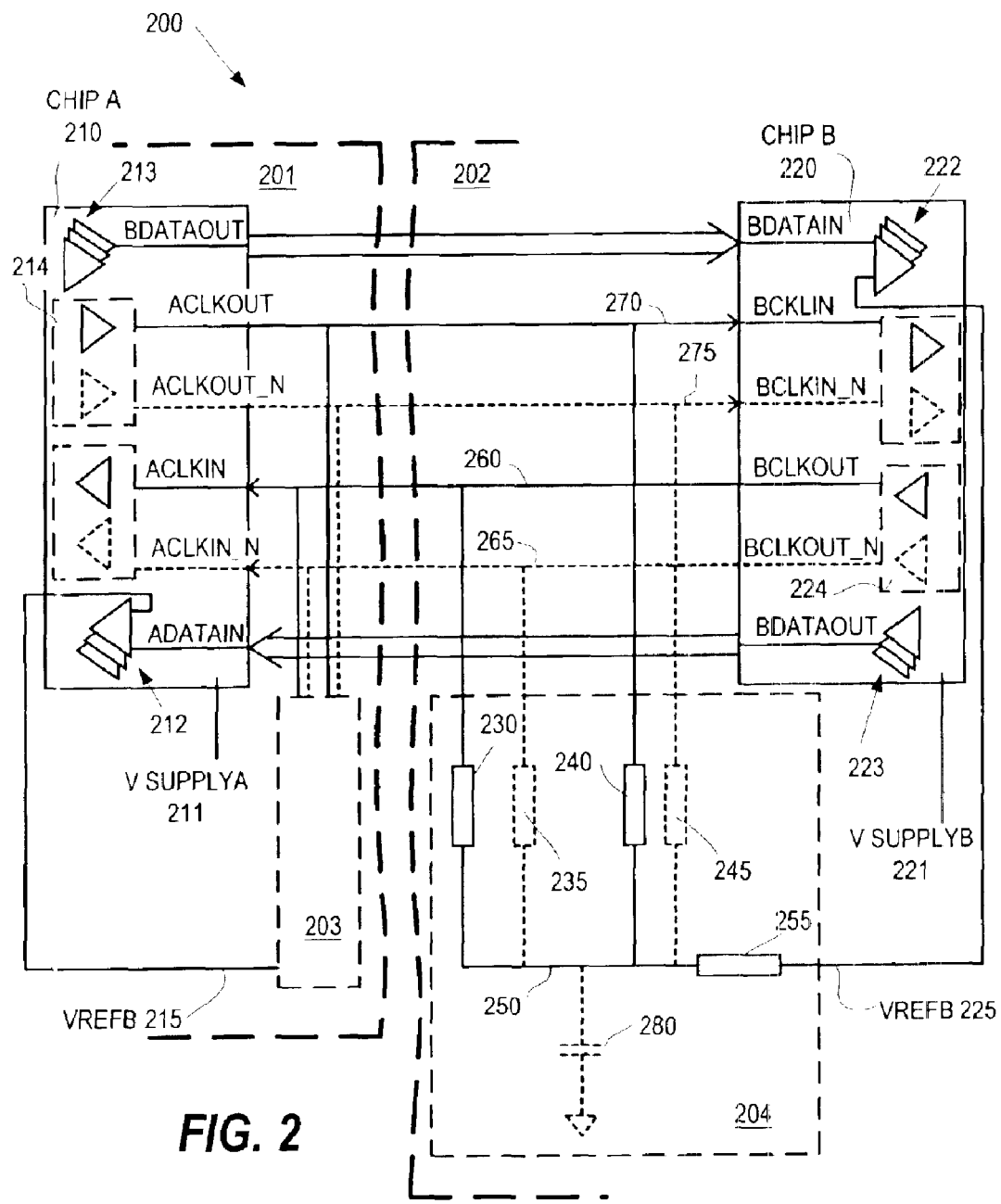
FIG. 2 illustrates aspects of a chip-to-chip communications interface, according to an embodiment of the present invention.

Referring now to FIG. 2, aspects of a chip-to-chip communication interface 200 are shown, according to an embodiment of the present invention. In general terms, a reference voltage, for example on the reference voltage line VREFB 225, is derived, i.e., detected, from clock signals on clock lines 260, 265, 270 and 275. More specifically, integrated circuit chip A 210, mounted on printed circuit board 201, has clock drivers 214 for generating differential output clock signals ACLKOUT and ACLKOUT_N, which are received on clock lines 270 and 275, respectively, as signals BCLKIN and BCLKIN_N on integrated circuit chip B 220, mounted on printed circuit board 202. The voltage level of the output clock signals ACLKOUT and ACLKOUT_N is determined by the voltage level of the operating voltage supply V SUPPLYA 211 to the drivers 214.

Chip 210 also has data drivers 213 that send data to chip 220. The voltage level of the binary data sent by drivers 213 is also determined by the voltage level of the operating voltage supply V SUPPLYA 211 to the drivers 213. Data sent by drivers 213 is received at chip 220 by receivers 222. A reference voltage is supplied to receivers 222 on reference voltage line VREFB 225. Receivers 222 use the reference voltage in order to detect the binary state of the data received, i.e., comparing the reference voltage with the received data signals in order to determine whether the voltage level of the data is above or below a threshold voltage level, which indicates either a "1" state or a "0" state.

In the embodiment illustrated, the chips 220 and 210 have certain symmetrical aspects. That is, just as chip 210 has circuitry 214 for generating differential output clock signals ACLKOUT and ACLKOUT_N, likewise chip 220 has clock drivers 224 for generating its own differential output clock signals BCLKOUT and BCLKOUT_N, which are received on clock lines 260 and 265, respectively, as signals ACLKIN and ACLKIN_N on integrated circuit chip B 210. The voltage level of the chip 220 output clock signals BCLKOUT and BCLKOUT_N is determined by the voltage level of the operating voltage supply V SUPPLYB 221 to the drivers 224. Similarly, chip 220 also has data drivers 223 that send data to chip 210. The voltage level of the binary data sent by drivers 223 is also determined by the voltage level of the operating voltage supply V SUPPLYB 221 to the drivers 223. Data sent by drivers 223 is received at chip 210 by receivers 212. A reference voltage is supplied to receivers 212 on reference voltage line VREFA 215. Receivers 212 use the chip 210 reference voltage in order to detect the binary state of the data received.

As previously stated, and as may be seen in FIG. 2, the reference voltage on line VREFB 225 is derived from clock signals on clock lines 260, 265, 270 and 275. Specifically, reference voltage generation circuitry 204 has sets of resistors 230, 235, 240 and 245 coupled to the respective clock lines 260, 265, 270 and 275. The resistors 230 and 235 coupled to one set of differential clock lines 260 and 265 are matched to one another, that is, they have substantially equal impedance. Likewise, the resistors 240 and 245 coupled to the other set of differential clock lines 270 and 275 are matched to one another. All four resistors are terminated on a common node 250. The node 250 is coupled to ground through a capacitor 280. The capacitor 280 serves to smooth out noise created because the differential clock signals are typically not exactly the ideal 180 degrees out of phase with one another. A first terminal of an output resistor 255 is also coupled to the common node 250 to dampen any noise propagating from chip 220. The other terminal of output resistor 255 is coupled to the voltage reference line VREFB 225 for supplying the reference voltage to chip 220. In order to ensure that the voltage reference circuitry 204 does not significantly load the clock drivers 214 and 224, resistors 230, 235, 240 and 245 must be relatively large—for example, 500 ohms on a 50 ohm circuit board 202. Also, the wiring length from each clock wire 260, etc. to the resistors 230, etc. must be very short—for example, less than 0.05 inch.

In symmetrical fashion, chip 210 has a corresponding reference voltage generating circuitry 203 on printed circuit board 201 for generating the chip 210 reference voltage on line VREFA 215. The circuitry 203 is also coupled to the clock lines 260, 265, 270 and 275, but, of course, at the chip 210 end of the clock lines.

Figure 3:
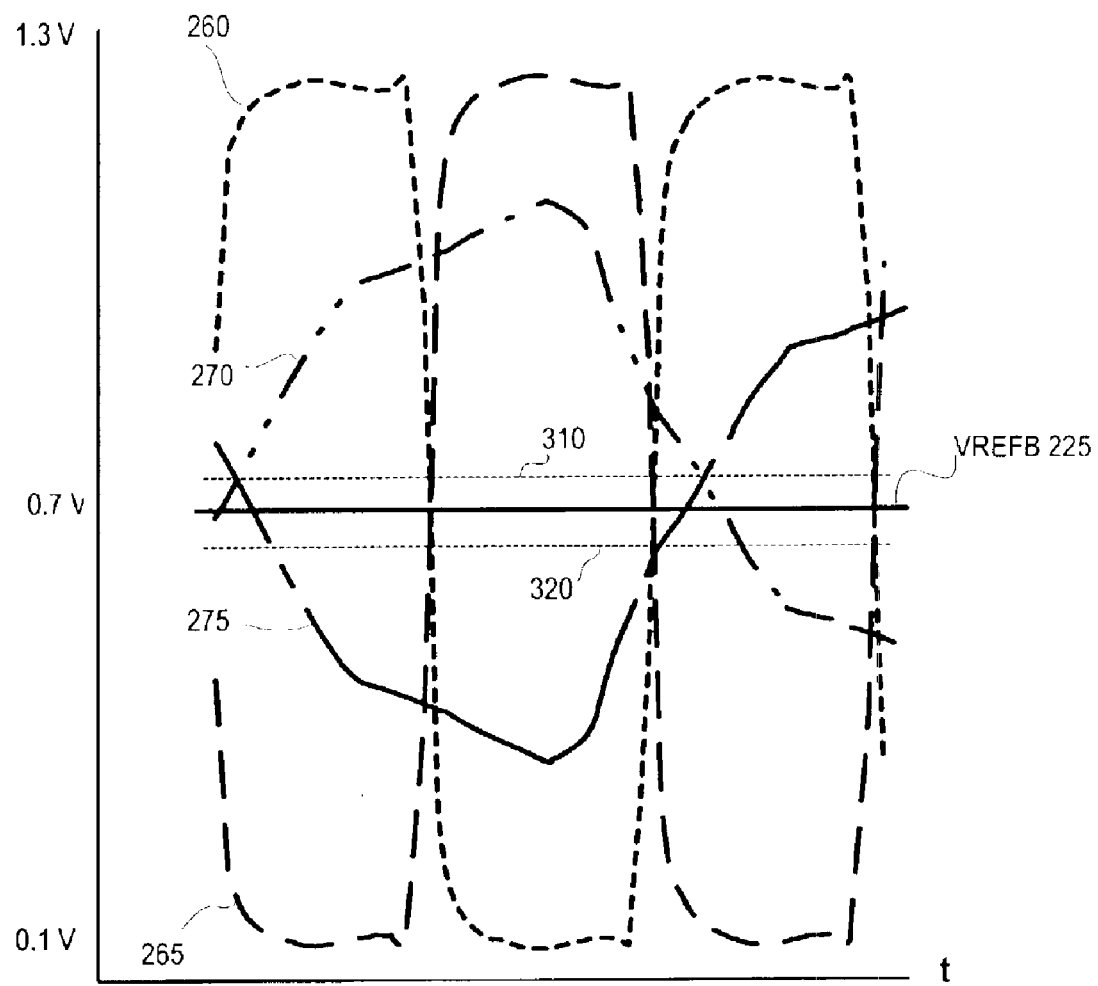
FIG. 3 illustrates various voltages of the embodiment of FIG. 2.

Referring now to FIG. 3 along with FIG. 2, voltages are illustrated for the clock signals on lines 260, 265, 270 and 275 and for the derived reference voltage VREFB 225. The clock signals generated by drivers 224 (FIG. 2) on lines 260 and 265 are "differential" clock signals. That is, a signal BCLKOUT is generated by one of the drivers 224 and a complementary clock signal BCLKOUT_N is generated by another one of the drivers 224. Similarly, the clock signals generated by drivers 214 (FIG. 2) on lines 270 and 275 are differential clock signals.

Setting aside consideration of the signals on clock lines 260 and 265 for a moment, since the clock signals on lines 270 and 275 are ideally complementary and thus very close to 180 degrees out of phase with each other, the bridging of these clock lines 270 and 275 by closely matched resistors 240 and 245 results in a voltage 310 at node 250 that is an almost purely DC voltage that corresponds to the common mode voltage of the differential clock signals on lines 270 and 275. Similarly, the clock signals on lines 260 and 265 are very close to 180 degrees out of phase with each other, so that the bridging of these lines by closely matched resistors 230 and 235 results in a voltage 320 at node 250 that is a nearly pure DC voltage that corresponds to the common mode voltage of the differential clock signals on these lines 260 and 265.

With the two sets of resistors 230/235 and 240/245 tied together at node 250, the voltage on node 250, and correspondingly on the reference voltage line VREFB 225 as shown, is a combination of the common mode voltages 310 and 320 for the two sets differential clock signals. Thus, according to the above described embodiment the reference voltage on line VREFB 225 advantageously depends partly on the supply voltage V SUPPLYB 221 which is supplied to the receivers 222 and the clock drivers 224, since the reference voltage VREFB 225 is derived, in part from the common mode voltage level of the clock signals sent by the clock drivers 224, which depends on the level of supply voltage V SUPPLYB 221.

Figure 4:
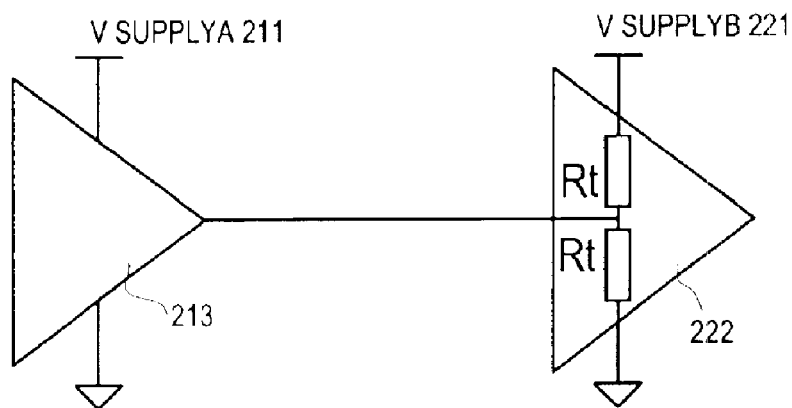
FIG. 4 illustrates, in simplified fashion, certain aspects of a driver and receiver, according to an embodiment.

Referring now to FIG. 4, aspects relating to the above described voltage dependencies are shown for driver 213 and receiver 222 in simplified fashion, according to an embodiment. Of course, the signal received at receiver 222 depends on the driver 213 supply voltage V SUPPLYA 211 which drives the signal. From the simplified detail of receiver 222 it can be seen that the receiver 222 terminates the signal at the common node of resistors Rt, which are connected in series from the receiver supply voltage V SUPPLYB 221 to ground, so supply voltage V SUPPLYB 221 adds a DC bias to the received data signal.

Referring again to FIG. 2, it can be seen it is advantageous that for the DC bias effect of voltage V SUPPLYB 221 on the voltage level of data received by receivers 222 there is a corresponding effect on the clock signals generated by the clock drivers 224, and in turn a corresponding effect on the reference voltage VREFB 225 due to the supply voltage V SUPPLYB 221 being fed to the common node 250 via the voltages driven on the clock signal lines 260 and 265 by clock drivers 224. Thus, the comparing by data receivers 222 of voltage levels of the received data signals to the derived reference voltage VREFB 225 tends to cancel out the effect of the receiver supply voltage V SUPPLYB 221 on the received data signals.

In the above described embodiment, chips 210 and 220 have symmetrical drivers, receivers, voltage reference generation circuitry and clock signals. Consequently, it should be understood that the advantageous features of the voltage reference arrangement of the present embodiment apply to data sent in either direction, despite the focus of description herein on data sent from chip 210 to chip 220.

In the above described embodiment, reference has been made to differential clock signals on lines 260 and 265 and on lines 270 and 275, respectively. In an alternative embodiment of the invention one or both of the clock signals generated by respective drivers 224 and 214 are single-ended, i.e., not complementary. For this reason the clock lines 265 and 275 are shown as dashed lines in FIG. 2, as are the resistors 235 and 245 tied to these lines 265 and 275.

Figure 5:
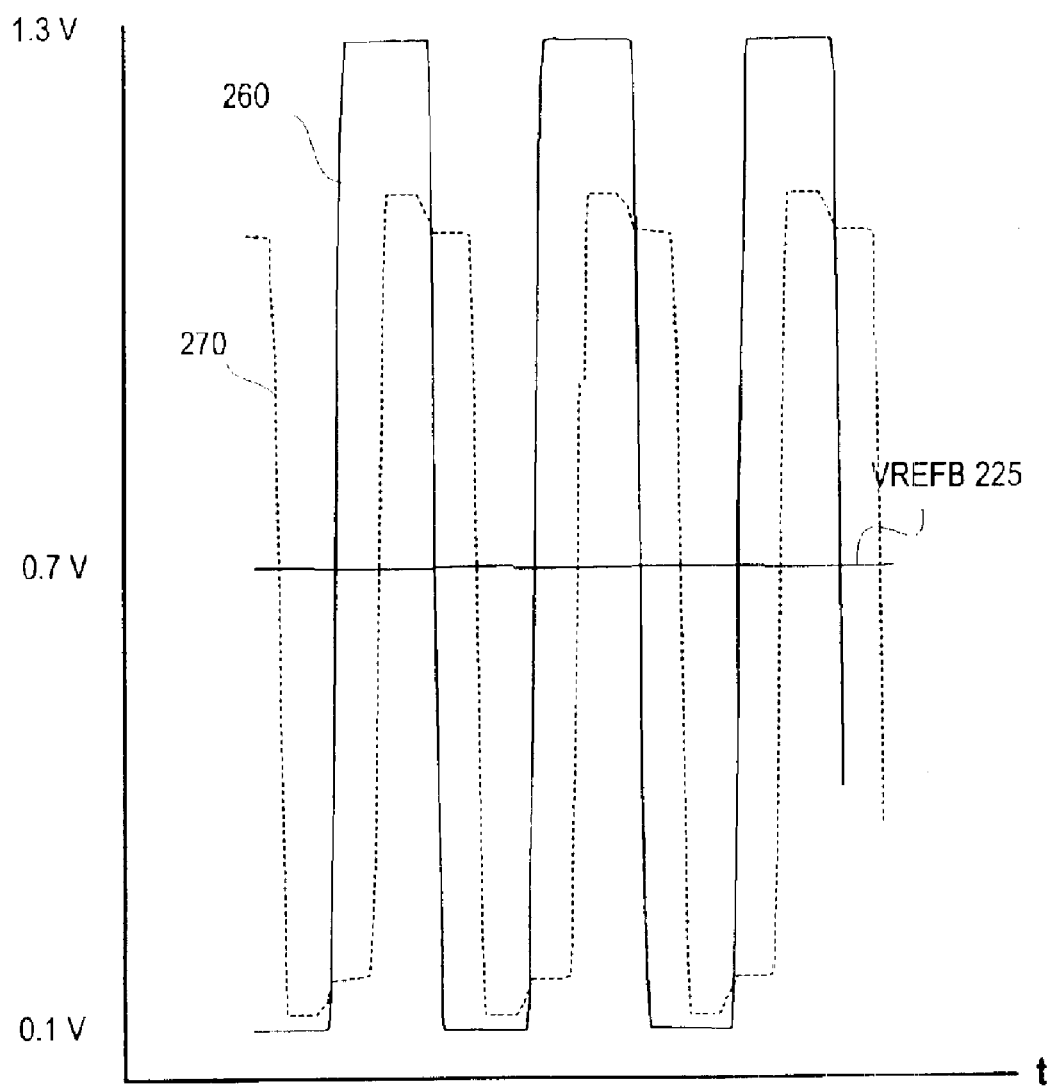
FIG. 5 illustrates various voltages of a single-ended clock embodiment.

Referring now to FIG. 5, along with FIG. 2, for this alternative embodiment voltages are illustrated for the clock signals on lines 260 and 270 and for the derived reference voltage VREFB 225. It can be seen in this FIG. 5 that the voltage on VREFB 225 has some frequency content. Note that the capacitor 280 in FIG. 2 is shown dashed. This is because if the clock signals generated by drivers 224 and 214 are both differential and are close to ideal, as illustrated in FIG. 3, then the capacitor 280 can be eliminated, although it is still preferred due to deviations from the ideal. However, for the alternative embodiment, voltages for which are illustrated in FIG. 5, the capacitor 280 is a necessity. Furthermore, for this embodiment the capacitor 280 must be relatively large in order to hold VREFB 225 at the common mode charge of the clock signals on lines 260 and 270. That is, the capacitor 280 is important for making this arrangement work by charging up to the average value of the clock signals.

Figure 6:
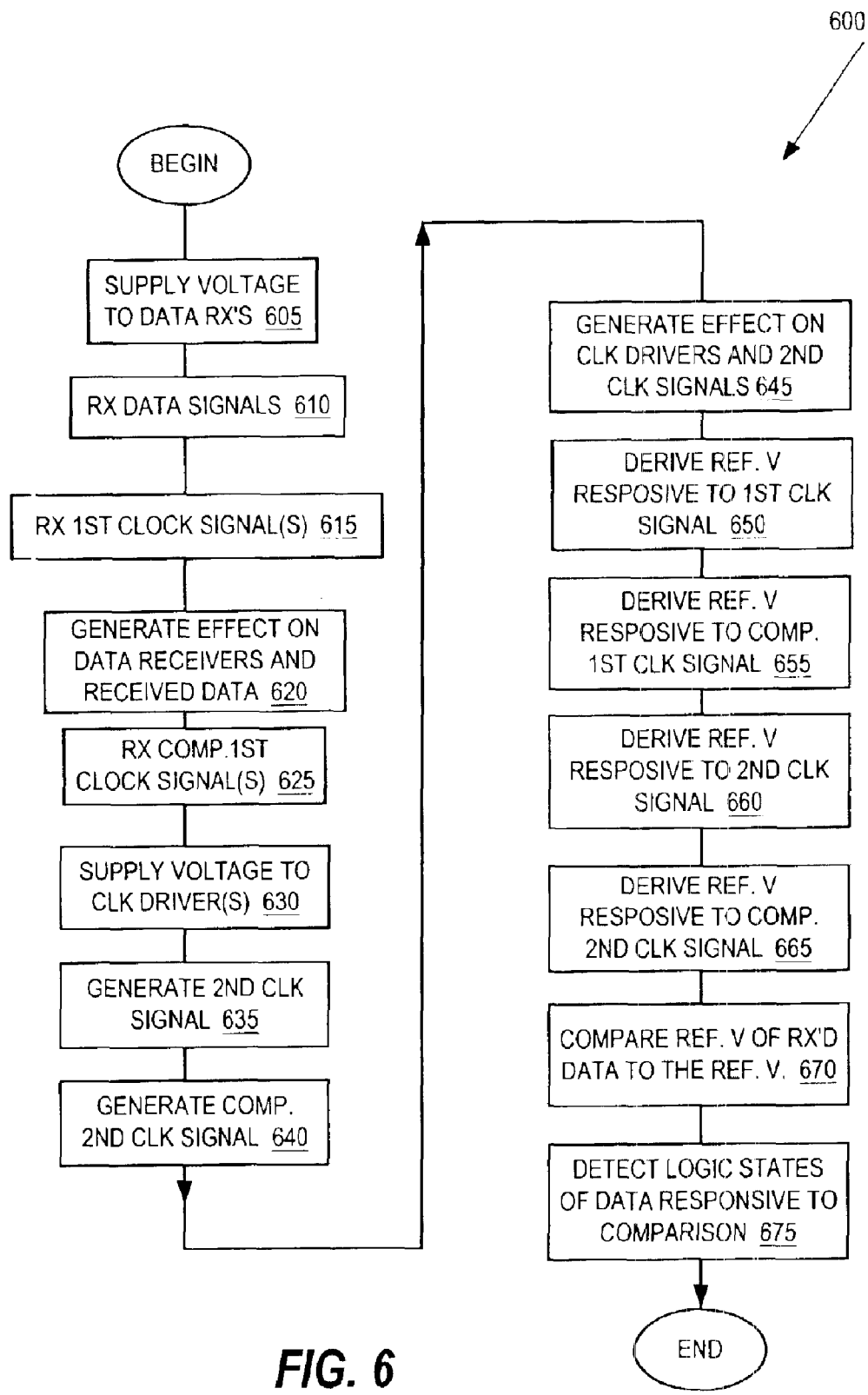
FIG. 6 illustrates certain method aspects, according to an embodiment of the present invention.

Referring now to FIG. 6, certain aspects of a method form of an embodiment are illustrated in flowchart 600. It should be understood that the actions described in the flowchart 600 do not have to be performed solely in the sequence in which they are set out, and that additional actions may be included or actions described herein may be omitted.

In logic block 605, a supply voltage is supplied to data receivers for a receiving chip.

In logic block 610, the data receivers receive data signals sent by a sending chip.

In logic block 615, the at least one clock receiver of the receiving chip receives a first clock signal sent by a sending chip.

In logic block 620, the supply voltage generates an effect on the data receivers, which in turn affects the voltage levels of the received data signals.

In logic block 625, a complementary first clock signal is received by one of the at least one clock receivers of the receiving chip.

In logic block 630, a supply voltage is supplied to at least one clock driver for the receiving chip.

In logic block 635, a second clock signal is generated by at least one clock driver for the receiving chip for sending by the receiving chip.

In logic block 640, a complementary second clock signal is generated by one of the at least one clock drivers for the receiving chip for sending by the receiving chip.

In logic block 645, the supply voltage generates an effect on the clock drivers, which in turn affects the voltage levels of the second clock signal and the complementary second clock signal in a manner corresponding to the effect of the supply voltage on the voltage levels of the received data signals.

In logic block 650, the first clock signal is received by reference voltage circuitry for the receiving chip and a reference voltage is responsively derived.

In logic block 655, the complementary first clock signal is received by the reference voltage circuitry and the reference voltage is derived further in response to the complementary first clock signal.

In logic block 660, the second clock signal is received by the reference voltage circuitry and the reference voltage is derived further in response to the second clock signal.

In logic block 665, the complementary second clock signal is received by the reference voltage circuitry and the reference voltage is derived further in response to the complementary second clock signal.

In logic block 670, the data receivers compare voltage levels of the received data signals to the derived reference voltage. Note that the comparing of voltage levels of the received data signals to the derived reference voltage tends to eliminate the effect of the supply voltage on the received data signals due to the effects described in 620 and 645.

In logic block 675, logical states of the received data signals are detected responsive to the comparing.

It should be appreciated from the above that the invention brings about significant cost savings since only one version of a printed circuit board is necessary to accommodate changes in technologies of drivers and receivers. Also, if a power supply setpoint changes, this will change the clock signals, which, due to the invention, will change the reference voltage without any change in the reference voltage generation circuitry. (This power supply setpoint change often happens without a technology change.)

The description of the present embodiment has been presented for purposes of illustration, but is not intended to be exhaustive or to limit the invention to the form disclosed. Many modifications and variations will be apparent to those of ordinary skill in the art. In other embodiments the two chips that communicate do not necessarily have to have all the symmetries of the above described arrangement. That is, voltage reference features of the present invention may be applied to just one chip. For example, chip 220 may have reference voltage generating circuitry 204 as shown in FIG. 2, but chip 210 may have a more conventional voltage generating circuitry.

Also, regardless of the voltage generating circuitry on chip 210, for example, in one alternative embodiment, the chip 220 voltage generating circuitry 204 has only the one set of resistors 240 and 245 coupled to clock lines 270 and 275. In another, the chip 220 voltage generating circuitry 204 has only the other set of resistors 230 and 235 coupled to clock lines 260 and 265.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for receiving data by an integrated circuitry chip, the method comprising the steps of:

receiving data signals and a first clock signal sent by a sending chip, wherein the data signals are received by data receivers and the clock signal is received by at least one clock receiver of the receiving chip;

deriving a reference voltage from the first clock signal by reference voltage circuitry for the receiving chip signal; and detecting logical states of the received data signals, wherein the detecting includes the data receivers comparing voltage levels of the received data signals to the derived reference voltage.

2. The method of claim 1, comprising the step of:

generating a second clock signal by at least one clock driver for the receiving chip for sending by the receiving chip, wherein deriving the reference voltage by the reference voltage circuitry for the receiving chip includes deriving the reference voltage responsive to the second clock signal.

3. The method of claim 2, comprising the steps of:

supplying a supply voltage to the data receivers for the receiving chip; and generating an effect by the supply voltage on the voltage levels of the received data signals.

4. The method of claim 3, comprising the steps of:

supplying a supply voltage to the at least one clock driver for the receiving chip; and generating an effect by the supply voltage on a voltage level of the second clock signal corresponding to the effect by the supply voltage on the voltage levels of the received data signals, so that the comparing of voltage levels of the received data signals to the derived reference voltage tends to cancel out the effect of the supply voltage on the received data signals.

5. The method of claim 2, comprising the step of:

generating a complementary second clock signal, wherein deriving the reference voltage by the reference voltage circuitry for the receiving chip includes deriving the reference voltage responsive to the complementary second clock signal.

6. The method of claim 4, comprising the step of:

receiving a complementary first clock signal, wherein deriving the reference voltage by the reference voltage circuitry for the receiving chip includes deriving the reference voltage responsive to the complementary first clock signal.

7. An apparatus for receiving data by an integrated circuitry chip comprising:

data receivers for receiving data by the chip;

at least one clock receiver for receiving a first clock signal by the chip on a first clock line set, the first clock line set having at least one clock line; and reference voltage circuitry coupled to the at least one clock line for deriving a reference voltage responsive to the first clock signal, wherein the derived reference voltage is coupled to the data receivers for comparing by the data receivers to voltage levels of the received data.

8. The apparatus of claim 7, comprising:

at least one clock driver for generating a second clock signal for sending by the chip, wherein the reference voltage circuitry is coupled to a second clock line set having at least one clock line, the reference voltage circuitry being operable for deriving the reference voltage responsive to the second clock signal.

9. The apparatus of claim 8, wherein the data receivers are operable to receive a supply voltage, and the supply voltage generates an effect on the voltage levels of the received data.

10. The apparatus of claim 9, wherein the at least one clock driver is operable to receive the supply voltage, and the supply voltage generates an effect on a voltage level of the second clock signal corresponding to the effect by the supply voltage on the voltage levels of the received data signals, so that the comparing of voltage levels of the received data signals to the derived reference voltage tends to cancel out the effect of the supply voltage on the received data signals.

11. The apparatus of claim 8, comprising:

a second clock driver for generating a complementary second clock signal for sending by the chip on a second clock line of the second clock line set, wherein the reference voltage circuitry is coupled to the second clock line of the second clock line set, the reference voltage circuitry being operable for deriving the reference voltage responsive to the complementary second clock signal.

12. The apparatus of claim 8, wherein the reference voltage circuitry comprises:

a first resistor set having at least a first resistor with a first terminal coupled to the at least one clock line of the first clock line set; and a second resistor set having at least a first resistor with a first terminal coupled to the at least one clock line of the second clock line set, wherein the at least first resistor of the first resistor set has a second terminal coupled to a second terminal of the at least first resistor of the second clock line set, the coupled second terminals providing a common node for the reference voltage circuitry.

13. The apparatus of claim 12, wherein the reference voltage circuitry comprises:

a capacitor having a first terminal coupled to the common node and a second terminal coupled to ground.

14. The apparatus of claim 11, wherein the reference voltage circuitry comprises:

a first resistor set having at least a first resistor with a first terminal coupled to the at least one clock line of the first clock line set; and a second resistor set having at least first and second resistors, the first and second resistors of the second resistor set having respective first terminals coupled to the respective first and second clock lines of the second clock line set, wherein the at least first resistor of the first resistor set has a second terminal coupled to second terminals of the at least first and second resistors of the second clock line set, the coupled second terminals providing a common node for the reference voltage circuitry.

15. An apparatus for receiving data by an integrated circuitry chip comprising:

data receivers for receiving data by the chip;

at least one clock receiver for receiving a first clock signal by the chip on a first clock line set, the first clock line set having at least one clock line;

reference voltage circuitry coupled to the at least one clock line for deriving a reference voltage responsive to the first clock signal, wherein the derived reference voltage is coupled to the data receivers for comparing by the data receivers to voltage levels of the received data;

at least one clock driver for generating a second clock signal for sending by the chip, wherein the reference voltage circuitry is coupled to a second clock line set having at least one clock line, the reference voltage circuitry being operable for deriving the reference voltage responsive to the second clock signal, wherein the data receivers are operable to receive a supply voltage, and the supply voltage generates an effect on the voltage levels of the received data, wherein the at least one clock driver is operable to receive the supply voltage, and the supply voltage generates an effect on a voltage level of the second clock signal corresponding to the effect by the supply voltage on the voltage levels of the received data signals, so that the comparing of voltage levels of the received data signals to the derived reference voltage tends to cancel out the effect of the supply voltage on the received data signals, and a second clock driver for generating a complementary second clock signal for sending by the chip on a second clock line of the second clock line set, wherein the reference voltage circuitry is coupled to the second clock line of the second clock line set, the reference voltage circuitry being operable for deriving the reference voltage responsive to the complementary second clock signal.

16. The apparatus of claim 15, wherein the reference voltage circuitry comprises:

a first resistor set having at least a first resistor with a first terminal coupled to the at least one clock line of the first clock line set; and a second resistor set having at least a first resistor with a first terminal coupled to the at least one clock line of the second clock line set, wherein the at least first resistor of the first resistor set has a second terminal coupled to a second terminal of the at least first resistor of the second clock line set, the coupled second terminals providing a common node for the reference voltage circuitry.

17. The apparatus of claim 16, wherein the reference voltage circuitry comprises:

a capacitor having a first terminal coupled to the common node and a second terminal coupled to ground.

18. The apparatus of claim 15, wherein the reference voltage circuitry comprises:

a first resistor set having at least a first resistor with a first terminal coupled to the at least one clock line of the first clock line set; and a second resistor set having at least first and second resistors, the first and second resistors of the second resistor set having respective first terminals coupled to the respective first and second clock lines of the second clock line set, wherein the at least first resistor of the first resistor set has a second terminal coupled to second terminals of the at least first and second resistors of the second clock line set, the coupled second terminals providing a common node for the reference voltage circuitry.

\* \* \* \* \*